United States Patent Office 3,121,092
Patented Feb. 11, 1964

3,121,092
PYRAZOLE DERIVATIVE
Adolph Oscar Geiszler, Mundelein, Ill., assignor to Abbott Laboratories, North Chicago, Ill., a corporation of Illinois
No Drawing. Filed Jan. 29, 1962, Ser. No. 169,652
1 Claim. (Cl. 260—310)

This invention relates to 5-cyano-1,3-dimethyl-4-nirto-pyrazole of the formula

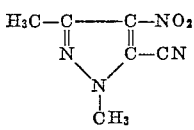

and a method for its preparation. This compound is useful as a coccidiostat. In representative operations, it was found that when said compound was incorporated into the feed of poultry at a concentration of from .01% to .05% by weight and fed to poultry heavily infested with coccidiosis due to the presence of the protozoan organism *Eimeria tenella*, excellent control of coccidiosis resulted.

The new compound of this invention can be readily prepared by nitrating 5-chloro-1,3-dimethylpyrazole at or below room temperature to obtain the intermediate 5-chloro-1,3-dimethyl-4-nitropyrazole of the formula

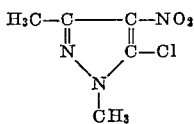

which is then heated with an alkali metal cyanide, preferably potassium cyanide, at a temperature of 120°–130° C. in the presence of a solvent such as dimethylformamide. Upon removal of the solvent and treatment of the residue with water, the mixture is acidified and coolant to precipitate the desired 5-cyano-1,3-dimethyl-4-nitropyrazole which is purified by recrystallization from a suitable solvent, preferably a water-alcohol mixture.

The following example illustrates a specific embodiment of the invention and is not to be construed as limiting.

EXAMPLE

5-Cyano-1,3-Dimethyl-4-Nitropyrazole

In the first step of the reaction, 155 ml. of fuming nitric acid was added slowly at from 0° to 10° C. to a mixture of 200 ml. of concentrated sulfuric acid and 63 g. (0.48 mole) of 5-chloro-1,3-dimethylpyrazole. After standing at room temperature for 15 hours, the reaction mixture was poured into 2 liters of ice-water. The white solid which formed was separated by filtration, washed with water and dried to obtain the intermediate 5-chloro-1,3-dimethyl-4-nitropyrazole melting at 77°–78° C.

In the second step of the reaction, a mixture of 75 ml. of dimethylformamide, 3.6 g. (0.05 mole) of potassium cyanide and 8.8 g. (0.05 mole) of the intermediate prepared above was stirred and heated at 120°–130° C. for 4 hours and thereafter allowed to stand at room temperature for 17 hours. The solvent was then removed and the residue diluted with water. The aqueous solution was acidified and heated under reduced pressure to remove any hydrocyanic acid. Upon cooling, the desired 5-cyano-1,3-dimethyl-4-nitropyrazole precipitated and was removed by filtration. After washing with water and recrystallizing from a water-ethanol mixture, the product melted at 98°–100° C.

What is claimed is:
5-cyano-1,3-dimethyl-4-nitropyrazole.

References Cited in the file of this patent
UNITED STATES PATENTS

| | | |
|---|---|---|
| 2,748,051 | Zbornik et al. | May 29, 1956 |
| 2,759,949 | Hitchings et al. | Aug. 21, 1956 |
| 2,827,415 | Freeman et al. | Mar. 18, 1958 |
| 2,998,425 | Dickinson et al. | Aug. 29, 1961 |
| 3,014,916 | Wright | Dec. 26, 1961 |
| 3,054,722 | Wiegand et al. | Sept. 18, 1962 |

FOREIGN PATENTS

| | | |
|---|---|---|
| 869,552 | Great Britain | May 31, 1961 |

OTHER REFERENCES

Jacobs: Pyrazoles and Related Compounds In: Elderfield Heterocyclic Compounds, vol. 5, pp. 101–104, N.Y., Wiley.

Morgan et al.: Jour. Chem. Soc. (London), vol. 123, pp. 1308–18.

Knorr et al.: Liebig's Annalen der Chemie, vol. 279, pp. 228–29 (1894).